United States Patent Office 3,371,008
Patented Feb. 27, 1968

3,371,008
METAL ADHESIVES CONTAINING EPOXY RESIN, POLYAMIDE RESIN AND PHENOLIC FLUX
Eugene F. Lopez, McSpadden Drive, Havre de Grace, Md. 21078
No Drawing. Continuation-in-part of application Ser. No. 127,516, July 28, 1961. This application Dec. 17, 1965, Ser. No. 514,680
10 Claims. (Cl. 161—186)

ABSTRACT OF THE DISCLOSURE

This invention relates to an adhesive having high metal-to-metal bond strength. It is formulated from a polyamide blended with an epoxy resin in which the polyamide is insoluble and with a flux or solvent comprising at least one di- or tri-hydroxy phenol.

---

This application is a continuation-in-part of my co-pending United States patent application Serial No. 127,516 filed July 28, 1961 and now abandoned.

This invention relates to an adhesive. More particularly, it relates to an adhesive having high metal-to-metal bond strengths, formulated from polyamide reacted with epoxy resin.

One recently introduced structural adhesive which has been finding increased acceptance in the aircraft industry is believed to be based on a blend of an epoxy resin with a polyamide soluble therein, the polyamide being one formed from a dicarboxylic acid and diamine. In service, the resulting adhesive produces high metal-to-metal bond strengths at a relatively low modulus, producing equally high bend, fatigue and peel strengths. Unfortunately, in spite of the advantages possessed by adhesives of the type described, e.g. a decrease in the inherent brittleness of the epoxy resin and increase in strength of the bond, these adhesives suffer from one serious disadvantage in that they possess a very poor resistance to water.

One object of this invention is to provide an adhesive yielding high metal-to-metal bond strengths formulated from epoxy resin and a polyamide, and possessing good water resistance.

A more specific object of this invention is to provide metal-to-metal bonded structures wherein the adhesive comprises epoxy resin blended with polyamide and with a solvent which dissolves and fluxes the polyamide with the epoxy resin, and which also reacts with the epoxide and polyamide.

These and other objects are accomplished by utilizing a polyamide which is insoluble in the epoxy resin in combination with a third constituent which acts as a flux and renders the epoxy resin and polyamide compatible. The flux comprises at least one di- or tri-hydroxy phenol and preferably a eutectic mixture of two or more polyhydroxy phenols.

In the description which follows preferred embodiments of the invention are described by way of illustration and are not to be construed as limitative.

EXAMPLE I

An adhesive was formulated by mixing the following: (1) 80 parts by weight of epoxy resin comprising 20 parts by weight of the very viscous liquid triglycidyl ether of 1,1,3 trishydroxy phenol propane, produced as described in U.S. Patent No. 2,801,989 and commercially available from Union Carbide as ERRZ 0901 plus 60 parts by weight of a liquid epoxy novolac based on polyfunctional phenols of the novolac type, commercially available from the Dow Chemical Company as X2638.1 and having a generalized, idealized formula as follows:

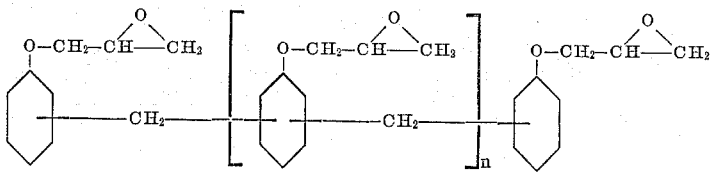

wherein $n$ is preferably about 1.2, (2) 20 parts by weight of nylon 11 (BCl 1107, Belding Corticelli Ind.), the nylon being a polymer of 11-amino-undecanoic acid and being insoluble in the mixture of epoxy resins, (3) 6 parts by weight of a fluxing agent consisting of a 1:1 mixture of resorcinol and catechol, and (4) 3 parts by weight of melamine as a curing agent. The resulting thermosetting composition is then ready to be applied to surfaces to be bonded as the adhesive mixture, whereupon the resulting composite of applied adhesive and elements to be bonded is heated slowly from about room temperature to about 350° F. They are maintained at the temperature of about 350° F. for about 1 hour, which completes the cure and results in a strongly bonded composite structure. During the curing operation the powdered or other solid form of nylon appears to dissolve in the molten phenolic components.

While I do not wish to be bound by any specific theoretical explanation of what then takes place, it appears likely that after the polyamide is taken into the melt, the terminal groups of the polyamide (one carboxylic group and one amino group) react with the epoxide groups causing the molecules of polyamide to become integrally cross-linked into the epoxide structure. During the solvation of the polyamide, the catechol and resorcinol appear to be concurrently dissolving the polyamide and chemically reacting wi h the epoxide. At the same time, the melamine is cross-linking the components.

The resulting adhesive product was tested for sheet strength with the results reported in Table I, below.

EXAMPLE II

The procedure of Example I was repeated except that the resorcinol and catechol were omitted from the mixture. The results reported in Table I show the loss in strength in the adhesive, presumably because the insoluble nylon did not react with the epoxy resin.

EXAMPLE III

The procedure of Example I was repeated except that the nylon was omitted from the mixture. The results reported in Table I, below, show the loss in strength experienced when the nylon is not present.

Table I reports the results of shear tests on ½ inch by 1 inch aluminum lap specimens prepared in accordance with Military Specification MIL-A-5090 D.

TABLE I

| Example | Room Temperature (p.s.i.) | 180° F. (p.s.i.) | 350° F. (p.s.i.) |
|---|---|---|---|
| I | 4,800 | 3,750 | 1,000 |
| II | 2,100 | 1,500 | 500 |
| III | 2,700 | 3,000 | 400 |

Table II, below, shows a comparison of the results of two commercially available polyamide-epoxy resin adhesives, believed to be composed of a soluble polyamide, with the Example I results. The test is conducted by placing specimens prepared under Military Specification MIL-A-5090D in boiling water for 72 hours and then testing immediately at room temperature.

TABLE II

| | Initial (p.s.i.) | After 3 Day Water Boil (p.s.i.) | Strength Loss, percent |
|---|---|---|---|
| FM-1000 [1] | 7,000 | 1,600 | 77 |
| Narmco 406 [2] | 5,500 | 1,300 | 76.5 |
| Example I | 4,800 | 4,000 | 16.7 |

[1] Obtainable from Bloomingdale Rubber Co.
[2] Obtainable from Narmco Industries.

Relatively few materials have been found to be suitable in the formulation of adhesives from the polyamide-epoxide resin system described above. Those solvents which have been found effective in dissolving the polyamide and then reacting in the polyamide-epoxide reaction, are solid, non-polymeric phenolic compounds having at least two hydroxyl groups attached to a ring carbon of a benzene ring, and represented by the general formula

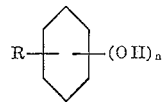

wherein R represents either hydrogen or lower alkyl and $n$ is an integer which is at least 2 and not greater than 3, in other words di- and tri-hydroxy phenols and alkyl substituted di- and trihydroxy phenols. Examples of suitable polyhydroxy compounds are resorcinol, catechol, pyrogallol, phloroglucinol, hydroquinone and hydroxyquinol. Preferably a eutectic blend of two or more fluxing agents may be used to permit lower temperatures of solvation of the polyamide.

Two modes have been found practical for the practice of the present invention. In either embodiment, the adhesive becomes operative when heated to the melting point of one of the solvents or fluxing agents, or slightly higher.

In the first mode, illustrated by Example I, the entire composition is formulated into a single mixture and applied to the surfaces to be bonded, as such.

In the second mode illustrated by the examples which follow, a mixture is formed comprising all of the ingredients except the polyamide, and the resulting composition is subsequently applied to a web or scrim of insoluble nylon. The resulting composite is then employed as the bonding material between the elements to be bonded.

EXAMPLES IV-IX

A mixture was formulated by bringing together 80 parts by weight of epoxy resin consisting of 20 parts by weight of the triglycidyl ether of Example I and 60 parts by weight of the epoxy novolac of Example I, and various amounts of di- or trihydroxy phenols as set forth in the table which follows and with about 3 parts by weight of melamine. Then the composition was applied to a web or scrim of insoluble nylon. The resulting composite was employed as the bonding material between the metals to be bonded. After heating and curing as in Example I, the composites were tested for shear strength with the following results:

| Example | Flux (Pts. by Wt.) | | | Lap Shear Strength (p.s.i.) | | | |
|---|---|---|---|---|---|---|---|
| | Resorcinol | Catechol | Pyrogallol | Room Temp. | 180° F. | 350° F. | Boil. Water (3 day) |
| IV | 1 | 3 | | 3,700 | 1,975 | 550 | 3,000 |
| | 3 | 3 | | 2,675 | 2,425 | 525 | 3,575 |
| | 6 | 3 | | 2,100 | 1,800 | 250 | 2,900 |
| | 9 | 3 | | 1,850 | 1,550 | ([1]) | 2,800 |
| | 12 | 3 | | 1,525 | 1,275 | ([1]) | 2,450 |
| V | 3 | 1 | | 4,075 | 2,250 | 625 | 2,100 |
| | 3 | 6 | | 2,075 | 1,800 | 225 | 2,575 |
| | 3 | 9 | | 2,075 | 2,000 | 125 | 1,925 |
| | 3 | 12 | | 1,075 | 1,300 | ([1]) | ([1]) |
| VI | 2 | 2 | | 4,065 | 2,475 | 350 | 3,400 |
| | 4 | 4 | | 3,800 | 1,825 | 125 | 3,325 |
| | 6 | 6 | | 2,075 | 1,600 | ([1]) | 2,700 |
| | 8 | 8 | | 1,825 | 1,075 | ([1]) | 700 |
| | 10 | 10 | | 1,325 | 1,000 | ([1]) | ([1]) |
| VII | 3 | | 1 | 3,850 | 2,900 | 425 | 4,000 |
| | 3 | | 3 | 3,625 | 2,950 | 300 | 4,100 |
| | 3 | | 6 | 3,875 | 2,125 | 365 | 4,300 |
| | 3 | | 9 | 4,100 | 3,550 | 350 | 3,800 |
| | 3 | | 12 | 4,050 | 3,950 | 300 | 4,150 |
| VIII | 1 | | 3 | 3,800 | 2,375 | 325 | 3,800 |
| | 6 | | 3 | 3,900 | 2,550 | 350 | 3,925 |
| | 9 | | 3 | 4,375 | 2,475 | 150 | 4,175 |
| | 12 | | 3 | 3,850 | 1,875 | 100 | 2,950 |
| IX | 2 | | 2 | 3,900 | 2,450 | 400 | 3,600 |
| | 4 | | 4 | 3,925 | 2,950 | 350 | 3,700 |
| | 6 | | 6 | 3,350 | 2,925 | 250 | 3,650 |
| | 8 | | 8 | 3,650 | 2,725 | 100 | 3,675 |
| | 10 | | 10 | 3,700 | 2,175 | 100 | 2,250 |

[1] No strength.

From Examples IV, V and VI above, it will be seen that when dihydroxyphenols are used as the fluxing agents the lap shear strength falls off as the relative proportions of the constituents departs from the eutectic ratio (1:1 for catechol and resorcinol) and as the amount of flux exceeds about 9 parts by weight with the 80 parts of epoxy constituent and 20 parts of polyamide.

From Examples VII, VIII and IX it will be apparent that trihydroxyphenol may be substituted for dihydroxyphenol as the flux without adversely affecting the lap shear strength and that when such a change is made the total amount of flux may be somewhat greater than when the flux is entirely dihydroxyphenol.

In general it would appear that the total amount of flux should comprise from about 2 to up to about 12 parts by weight in a total of 100 parts by weight of epoxy and polyamide.

Having described preferred embodiments of the invention in accordance with the patent statutes, it is not intended that the invention be limited except as required by the appended claims.

What is claimed is:

1. A composition comprising at least one liquid epoxy compound having an epoxy functionality greater than 2, a curing agent for said epoxy compound, a polyamide polymer of 11-aminoundecanoic acid insoluble in said epoxy compound, and a solvent fluxing agent for said polyamide selected from the group of phenolic compounds having the general formula

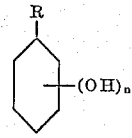

wherein R is selected from the group consisting of —H, and lower alkyl, and $n$ is an integer which is at least two and not more than three and wherein the proportions of epoxy compound to polyamide are between 3 and 5 parts of epoxy compound for each part of polyamide by weight.

2. The composition of claim 1 wherein the curing agent for said epoxy compound is melamine.

3. The composition of claim 1 wherein the solvent fluxing agent is a mixture of at least two dihydroxyphenols.

4. The composition of claim 1 wherein the solvent and fluxing agent is a mixture of at least one dihydroxyphenol and at least one trihydroxyphenol.

5. The composition of claim 1 wherein at least a portion of the polyamide is present in the composition as a coarsely woven cloth impregnated with the remaining ingredients of the composition.

6. An adhesive formed by preparing the composition of claim 1 and heating the same to flux and dissolve the polyamide, and maintaining the mixture heated for a time sufficient for the epoxy compound and polyamide to inter-react.

7. A metal bonded to a metal with a bonding material having the composition of claim 1.

8. A composition for adhesively joining metal to metal at temperatures up to about 350° F. which comprises:
 (1) about 80 parts by weight of liquid epoxy having an epoxy functionality greater than 2
 (2) about 20 parts by weight of polyamide insoluble in said liquid epoxy, said polyamide being the product of a self-condensation of 11-aminoundecanoic acid
 (3) between about 3 and 12 parts by weight of a fluxing agent selected from the group consisting of di- and trihydroxphenols represented by the general formula

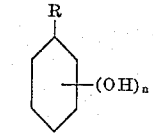

wherein R is selected from the group consisting of H and lower alkyl and $n$ is an integer which is at least 2 and not more than 3; and
 (4) about 3 parts by weight of an amine curing agent for said epoxy.

9. The composition of claim 8 wherein the curing agent is melamine, and the fluxing agent is a mixture of resorcinol and catechol.

10. The composition of claim 8 wherein the curing agent is melamine, and the fluxing agent is a 1:1 mixture of resorcinol and catechol.

References Cited

Don E. Floyd: "Polyamide Resins," 2nd ed., pp. 193–196, Reinhold Publishing Corp., New York 1966.

MORRIS LIEBMAN, *Primary Examiner.*

J. E. CALLAGHAN, *Assistant Examiner.*

UNITED STATES PATENT OFFICE
CERTIFICATE OF CORRECTION

Patent No. 3,371,008 February 27, 1968

Eugene F. Lopez

It is hereby certified that error appears in the above numbered patent requiring correction and that the said Letters Patent should read as corrected below.

Columns 3 and 4, in the table, sixth column, line 17 thereof, for "2,125" read -- 3,125 --; column 6, line 11, for "trihydroxphenols" read -- trihydroxyphenols --.

Signed and sealed this 27th day of May 1969.

(SEAL)
Attest:

Edward M. Fletcher, Jr.
Attesting Officer

Commissioner of Patents